United States Patent
Dalrymple

(10) Patent No.: US 7,277,203 B1
(45) Date of Patent: Oct. 2, 2007

(54) METHOD OF IMPROVING START-UP BEHAVIOR FOR COLOR ERROR DIFFUSION DIGITAL HALF-TONING

(75) Inventor: John Charles Dalrymple, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 754 days.

(21) Appl. No.: 09/667,964

(22) Filed: Sep. 21, 2000

Related U.S. Application Data

(60) Provisional application No. 60/160,360, filed on Oct. 18, 1999.

(51) Int. Cl.
| | |
|---|---|
| *G06K 15/00* | (2006.01) |
| *H04N 1/40* | (2006.01) |
| *H04N 1/405* | (2006.01) |
| *H04N 1/407* | (2006.01) |
| *H04N 1/409* | (2006.01) |

(52) U.S. Cl. .................... 358/3.03; 358/3.06; 358/3.26
(58) Field of Classification Search ...... 358/3.03–3.05, 358/1.9, 3.21, 3.13; 382/237, 252
See application file for complete search history.

(56) References Cited

U.S. PATENT DOCUMENTS

| | | | | |
|---|---|---|---|---|
| 5,107,346 A | * | 4/1992 | Bowers et al. .............. 358/447 |
| 5,210,602 A | * | 5/1993 | Mintzer ...................... 358/518 |
| 5,276,535 A | * | 1/1994 | Levien ....................... 358/3.03 |
| 5,339,134 A | * | 8/1994 | Nakamura et al. .......... 399/367 |
| 5,561,751 A | * | 10/1996 | Wong .......................... 345/589 |
| 5,757,976 A | * | 5/1998 | Shu ............................. 382/252 |
| 5,835,687 A | * | 11/1998 | Brown et al. ................ 358/1.9 |
| 5,880,857 A | * | 3/1999 | Shiau et al. ............... 358/3.03 |
| 5,987,483 A | * | 11/1999 | Edelkind et al. ........... 708/250 |
| 6,025,931 A | | 2/2000 | Bloomfield |
| 6,065,029 A | * | 5/2000 | Weiss ......................... 708/251 |
| 6,483,606 B1 | * | 11/2002 | Klassen et al. ............. 358/1.9 |
| 6,493,112 B1 | * | 12/2002 | Arce et al. ................. 358/3.19 |
| 6,798,537 B1 | * | 9/2004 | Lau et al. .................... 358/1.9 |

FOREIGN PATENT DOCUMENTS

JP 2001-014459 1/2001

OTHER PUBLICATIONS

Sams Teach Yourself Linux in 24 Hours, by Bill Ball and Stephen Smoogen, Sams Publishing, copyright 1998, pp. 32-34 and pp. 194-195.*

R.W. Floyd and L. Steinberg, "An Adaptive Algorithm for Spatial Greyscale," *Proceedings of the Society for Information Display*, vol. 17, No. 2, pp. 75-77, 1976.

* cited by examiner

*Primary Examiner*—David Moore
*Assistant Examiner*—James A. Thompson

(57) ABSTRACT

A method for initializing a printing system using error diffusion is discussed. In application of the invention to color printing systems, the method initializes a first error buffer with a first set of seed values and then initializes at least one other error buffer with another set of seed values. The other set of seed values is negatively correlated with respect to the first set of seed values in the first error buffer. The method then uses the seed values in all the error buffers to start an error diffusion process. For monochrome systems, only one error buffer is initialized with random numbers.

14 Claims, 1 Drawing Sheet

METHOD OF IMPROVING START-UP BEHAVIOR FOR COLOR ERROR DIFFUSION DIGITAL HALF-TONING

RELATED APPLICATIONS

This application is a continuation of, and claims priority to, U.S. Provisional Patent Application 60/160,360, filed Oct. 18, 1999.

BACKGROUND

1. Field

This invention relates to printing systems using digital halftoning, more particularly to printing systems using digital halftoning with error diffusion.

2. Background

Digital printers receive image data structured as a series of digital numbers that represent spatial samples of an analog image. Typically, there is a corresponding relationship between these samples and the physical dots to be printed. For example, a 600 dots-per-inch (dpi) printer will have 600 samples of data per lineal inch of the physical substrate, or a 600×600 square grid of samples to cover a square inch of the substrate (when producing a monochrome image). Each sample is represented via a predetermined number of bits, which determine the available shades of gray for the printer. An 8-bit sample, for example, can represent values between 0 and 255, which in turn can represent 0% coverage (i.e., no ink, toner, dye etc. is deposited at this location) and maximum coverage (the maximum physically realizable amount of ink, toner, dye etc. is deposited) respectively.

Some digital printers are capable of outputting varying amounts of their colorant material, from none up to a maximum density. "Bitonal" digital printers can only print a dot of a single density at each sample position, referred to as picture elements (pixels) on the printed image, or print nothing at said dot position. The simplest bitonal printers in the prior art have used a threshold to determine whether a dot is printed. At each sample location, if the value of the sample is above the threshold, the dot is printed. If the value of the sample is below the threshold, the dot is not printed. The threshold may be constant over the whole image, or may be variable based on position or other methods as practiced in the prior art.

This approach may lead to inaccurate images, since the actual values printed correspond to either 0, when no dot is printed, or 255 when a dot is printed. This assumes an 8-bit value for each sample. The actual value of the pixel may have been much different. For example, the threshold may be set at the pixel value 128. If a pixel has a value of 127, no dot is printed. The error between the actual value printed, 0, and the value desired 127, is fairly large. This can lead to discontinuities and artifacts in the printed image.

A prior-art technique referred to as error diffusion offers a solution to this problem. The difference between actual printed and desired values is divided up and passed on to neighboring pixels, in what will be referred to as standard error diffusion. Using the example above, the error value of 127 will be passed or diffused to neighboring pixels yet to be rendered in the processing stream. Typically, neighboring pixels receive a set proportion of the error value. A typical scheme is to assign the value in proportions of 1/16, 3/16, 5/16 and 7/16. In this example, the value of 127 would be multiplied by these ratios and the resulting number would be added to the desired pixel value for the neighboring pixel.

If the error value were 8 and the desired pixel value were 121, the resulting pixel value would be 129. Note that this pixel would have a dot printed after the addition of the error value whereas it would not have had one printed without the error. This approach is referred to as standard, or Floyd-Steinberg, error diffusion. The error is pushed from the current pixel to subsequent pixels. This approach was originally disclosed in by R. W. Floyd and L. Steinberg in "An Adaptive Algorithm for Spatial Grayscale," *Proceedings of the Society for Information Display*, vol. 17, no. 2, pp. 75-77, 1976.

An alternative error diffusion algorithm is referred to as back error compensation. In this method, the error value is computed by summing weighted values already computed at pixel locations previously processed. The summation results in an error value added to the desired value. The resulting value is then used to print a dot or not, and an error value is computed for that pixel and stored. In this approach, the error value for a given pixel is pulled from neighboring pixels.

These two approaches have been demonstrated to be mathematically equivalent. Other variations of each of these approaches are well known in the art. The detailed behavior of the dot patterns produced by these methods depends upon the initial error values, referred to herein as seed values.

If the image is monochrome, there will only be one set of seed values, those necessary to provide values for the process used to compute the error value. For color systems, there will be a set for each color, typically cyan (C), magenta (M), yellow (Y), and black (K). Alternatively, some systems use only CMY.

As discussed above, the current pixel value is a sum of the error value and the desired pixel value. The error value is either pushed to subsequent pixels or pulled from previous pixels. The process used to compute the current pixel value, that value that will actually be compared to the threshold, does not vary even if there are no previous pixels from which to obtain error values. These pixels use the seed values as their error values.

The first part of the printed image processed will be heavily influenced by the values of these seed values. They will affect the initial phase of the resulting dot pattern in the halftone image. This is especially true when a large uniform light area exists at the first part processed. A quasi-periodic artifact could appear in this area, because of phased-locked output patterns. Another difficulty can occur as coincident dot patterns. The human eye resolves two colored dots side by side as one colored dot that is a blend of the two. The eye is more sensitive to lightness variations than to colorfulness or hue variations. In lightly tinted regions, dot distributions of multiple colors that are jointly uniformly spatially distributed will produce more total dots per square inch and result in a less grainy appearance than is produced by coincident dot patterns that result in the same visual lightness. Furthermore, coincident dot patterns use subtractive mixture to produce secondary colors, and this process results in lower lightness and lower colorfulness than is obtained with the additive mixture that occurs when dots are side by side.

If in a color printing system, identical CMY (K) error diffusers having identical seed values are run independently of each other, and if in the first part of the printed image, any two or more of the color primaries happen to have equal tint levels, then the dot patterns generated for said primaries will be coincident. Therefore, a method is needed that manipulates the seed values to avoid objectionable artifacts in digital printed images.

SUMMARY

One embodiment of the invention is a method for initializing the contents of the error buffers in a color printing system using error diffusion. A first set of seed values is generated from random numbers for one of the colors. For color systems, at least one of the other colors use seed values negatively correlated with respect to the first set of seed values. All of the error buffers are used to start the error diffusion process used by the printing system.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
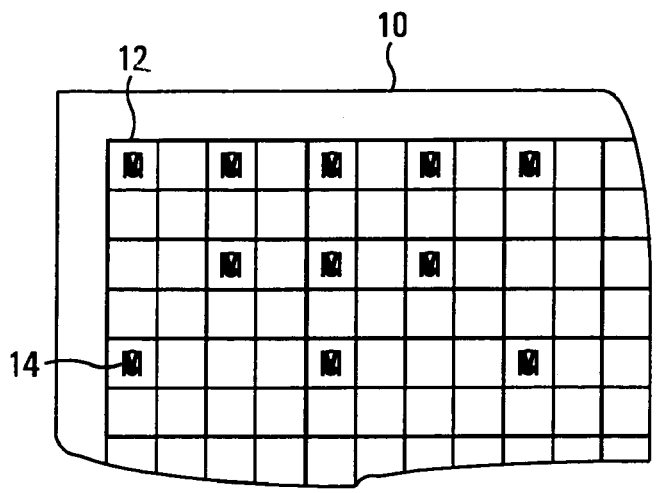
FIG. 1 shows an example of a pattern resulting from prior art implementations of error diffusion.

As discussed previously, most error diffusion processes rely upon existing error values to compute the current pixel value from the sum of the desired value plus the error. The error may have been diffused outward ("pushed") from previously processed pixels to subsequently processed pixels, including the current pixel, or is pulled from previously processed pixels when processing the current pixel. The current output pixel value (1 for a dot, or 0 for no dot) is influenced by previous error values and the current image pixel value. When the image is not very "busy," the primary influence is the error values. When the image is quite "busy" and contains a lot of random values throughout the whole dynamic range, the effect of the initial error values is obscured by the effect of the image values. But in the case of a light constant background, as often occurs in computer generated images, the output dot phase is strongly influenced by the error values used at initialization of the process.

Application of the invention is equally useful in single color printing systems, usually black, as well as monochrome. The discussion below will cover both applications, but will address color systems first. Error diffusion and its variants have been used in color halftoning systems. These systems perform halftoning of color images such as cyan (C), magenta (M), yellow (Y) and black (K) process color separations.

Monochrome printing systems use only one color ink or toner to achieve shades of that color, typically black and shades of gray. A problem that occurs with the current error diffusion approaches appears. For example, a large uniform light area in the first area printed will have a dot pattern phase throughout the entire area that depends upon the seed, or initial, error values. Using one of the current error diffusion approaches with no adjustment for this dependence results in periodic patterns that become noticeable in these types of regions in the first area being printed. Note that the first area being processed and printed will more than likely be the top of the image.

Application of the invention can mitigate these problems by initializing the error buffer values to be random or pseudo-random values. These tend to break up any of the periodic patterns that may otherwise detract from image quality. For a light tint, for example, the probability that a dot (a 1) will be output increases monotonically with the magnitudes of error residues in the set of pixels whose residues affect the current pixel. If the initial values of the error buffer are made to be larger than typical seed values, dots are more likely to be produced sooner when a transition occurs between a zero image region and a nonzero image region. This reduces the impact of the error diffusion process's startup transient on output image quality.

In addition, if the error values in the buffer are generated as random numbers, any periodic patterns will be mitigated or avoided. Therefore, for a single-color grayscale system, application of the invention will include generating a set of random numbers and controlling the selection of the numbers to be relatively large prior to loading the numbers in the error buffer for initialization.

In color systems, application of the invention will also include generation of random numbers. In the current state of the art, error diffusion and all its variation can be applied to systems performing halftoning of color images, such as CMYK process color separations. In the simplest of such systems, the same algorithm is applied to each color separation independently of the others. In these simplest systems, the error buffers are initialized to a constant value that is the same for all separations.

This uniformity results in phase-locked output dot patterns when two or more separation images happen to have equal tint levels. The worst case is referred to as coincident dot patterns. Coincident dots are those dots of different primaries that occur at the same pixel position. An example of one is shown as 14 in the printed image 10 of FIG. 1.

Color systems rely upon the integration properties of the human eye. Digital output devices have picture elements, or pixels, that form the image. Small pixels of different colors are resolved into one dot. The eye will resolve a pair of coincident colored dots as a blend of the two colors. More dots of one color will be resolved as a dot of a darker shade of that color.

As can be seen in the image 12 on printed document 10 of FIG. 1, the coincident dots of C M Y at 14 will appear as the subtractive combination of the colors if the inks are transparent, not the desired color. With opaque inks, the dot will appear as the last color applied. In areas in which there are equal amounts of the colors this problem becomes very noticeable, especially in light areas. For example, the coincident dot pattern was made to occur by using the following inputs to a halftoning algorithm for a constant region: 1% C; 1% M; and 1% Y.

Figure 2:
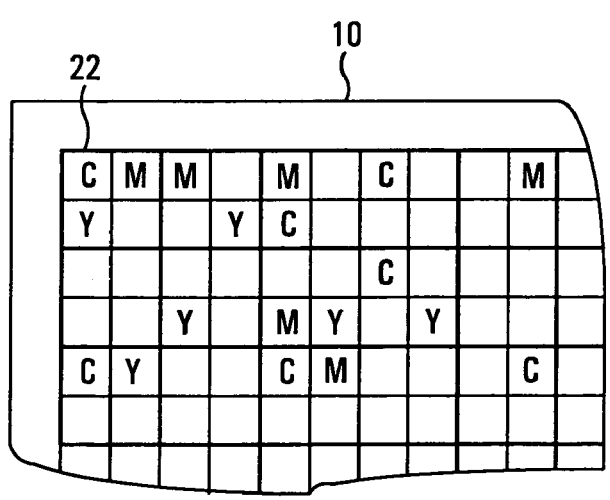
FIG. 2 shows an example of a pattern resulting from implementations of error diffusion in accordance with the invention.

Application of the invention would result in dot patterns in the pixels such as the one shown at 22 in FIG. 2 at pixel 22. These illustrations are merely for explanation of the effect of the invention, and are not meant as actual results. In this pixel, as well as the other pixels in the printed image 12, the initial error buffer values were generated using random noise or pseudo-random noise. As pseudo-random noise is statistically similar to true random numbers, both of these approaches will be referred to as random number generation or random numbers.

Figure 3:
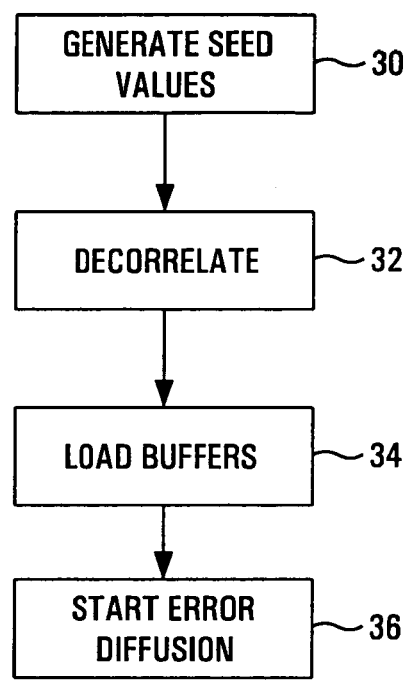
FIG. 3 shows a flow chart of one embodiment of a method for initializing the error buffers in a printing system, in accordance with the invention.

A flowchart of one embodiment of the invention using random numbers is shown in FIG. 3. At 30 a first set of seed values is generated. These seed values would typically be generated from a random number or noise generator. In the case of pseudorandom noise, the numbers may be manipulated to achieve other effects, as discussed above in the monochrome printing application.

To better mitigate any possible phase relationship between the colors, as demonstrated in FIG. 1, the contents of the error buffers will be negatively correlated at 32. This will decrease the likelihood of coincident dots occurring at the first printed area of the image. The negative correlation can be performed on all four colors, on all color but black, or on only two colors. In one embodiment of the invention, only the error buffers for C and M are negatively correlated with an out-of-phase relationship.

The use of the term "out-of-phase" is somewhat of a misnomer. For example, to provide negative correlation of the cyan and magenta error buffers, the error values used to seed the cyan buffer are multiplied by a negative number, such as −1 (and possibly also offset by a constant) to create the magenta seed values. Creation of three buffers that are pairwise negatively correlated requires a bit more computation.

For example, by starting with two generated random variables $R_1$ and $R_2$, which are independent and uniformly distributed on the unit interval, it is possible to create three normally distributed random variables $X_1$, $X_2$ and $X_3$, according to the following relationships:

$$X_1 = \sqrt{-2\ln R_1} \cos(2\pi R_2),$$

$$X_2 = \sqrt{-2\ln R_1} \cos(2\pi (R_2 - 1/3)),$$

$$X_3 = \sqrt{-2\ln R_1} \cos(2\pi (R_2 - 2/3)).$$

This results in three sets of values out-of-phase with each other by 120°, if the phase relationship analogy is continued. The negative correlation between the numbers in the error buffers will control the behavior of the pixels at the top of an image to eliminate or mitigate artifacts caused by error diffusion. These three random variables $X_1$, $X_2$ and $X_3$ are pairwise negatively correlated. In seeding three error buffers, for each buffer location, values of $R_1$ and $R_2$ are first generated. Then, $X_1$, $X_2$ and $X_3$ are computed as shown above. Finally, $X_1$ is loaded into the current location in the first buffer, $X_2$ into the current location in the second buffer, and $X_3$ into the current location in the third buffer. This process is repeated until all the buffer locations have been filled.

In the monochrome example, where only one set of seed values are needed, the buffer may be seeded with values such that at least one of the values varies numerically from the other values in the buffer. In a color example, each buffer may be seeded with a constant, as occurs in the current art. However, in the current art, each buffer is seeded with a set of values where each value is a replica of all of the other values. In the application of the invention, each buffer may be seeded with replicas of the same constant value, but each buffer will have a different value used from the other buffers.

Once the necessary numbers and their relative relationships are provided, they are loaded into the error buffers at 34. The loading of the buffers may be done in one of several ways. In a hardware implementation, the numbers could be predetermined during system build and the error buffers would be hard wired to load the desired numbers at system power on and initialization. The system processor may be directed to load a predetermined set of numbers from nonvolatile memory during system initialization. Alternatively, the system processor may compute the numbers at system initialization and load the numbers. Note that the contents of the error buffers will be repeatedly updated throughout the printing process, as new error values are computed from actual image data. No significant per-pixel computations would be required at run time to implement the invention.

Once the error buffers are loaded, the error diffusion process used by the reproduction system begins at 36. For current systems using error diffusion, implementation of the invention could also be performed as a software upgrade. Software on some sort of computer readable medium would be used to provide the printing system with the capabilities of the invention. The computer, in this case the printing system processor and its associated memory, would receive the code via the medium. The code would include code to perform the tasks of the invention as set out in FIG. 3. This process can be applied in any digital image reproduction system using error diffusion.

This invention could also be used in conjunction with error diffusion systems that work with other output devices, such as CRTs or LCDs, having a lower number of bits of signal precision than the number of bits used to represent the image. These systems use error diffusion to reduce the quantization error in going from the higher precision of the input image representation to the lower precision of the output display representation, e.g., an LCD driven by a 4-bit deep frame buffer provides 16 output levels. Error diffusion can be used to convert an 8-bit image into 4 bits. This invention can be used to improve the startup behavior of error diffusion used in this kind of application, as well as in printing applications.

However the invention is provided to printing systems, application of the invention will allow the system to take advantage of the error diffusion process without introducing any additional artifacts into the printed image. Application of the invention will mitigate or eliminate any periodic dot patterns that may occur with the use of error diffusion when applied to computer generated images, particularly ones having light tinted backgrounds.

Thus, although there has been described to this point a particular embodiment for a method and apparatus for controlling the start up behavior of printing systems using error diffusion, it is not intended that such specific references be considered as limitations upon the scope of this invention except in-so-far as set forth in the following claims.

What is claimed is:

1. A method to initialize one or more error buffers associated with an array of pixels for a monochrome digital image reproduction system, comprising:

generating a set of multiple random seed values from a random number generator independently of any image information associated with the array of pixels for initializing the error buffers and for use as initial error values when starting an error diffusion operation including generating random seed values associated with a first set of the array of pixels to be printed for a digital image;

adjusting each of the random seed values from the random number generator prior to starting the error diffusion operation such that the adjusted random seed values associated with the array of pixels are relatively large, likely to cause a dot to be printed and increase the likelihood that dots will be printed sooner when a transition occurs between a zero image region and a nonzero image region; and initializing the error buffers associated with the array of pixels with the set of adjusted random seed values that were generated independently of any image information associated with the array of pixels and adjusted prior to starting the error diffusion operation for reducing startup transients during the error diffusion operation including initializing a first set of the error buffers associated with the first set of the array of pixels to be printed for the digital image with adjusted random seed values that were generated independently of any image information and adjusted prior to the starting of the error diffusion operation.

2. The method according to claim 1 including initializing multiple different error buffers associated with multiple different pixels in the array with the set of multiple adjusted random seed values prior to starting any error diffusion operations.

3. The method according to claim 1 including loading the random seed values in the error buffers by selecting only the random seed values with relatively large values such that all of the adjusted random seed values associated with the array of pixels have relatively large values compared with the other random seed values and initializing the error buffers associated with the array of pixels only with the set of adjusted relatively large random seed values.

4. A method to initialize error buffers in a color digital image reproduction system, comprising:
generating a first set of random seed values used as initial error values for starting an error diffusion process for a first color plane;
generating a second set of random seed values so as to negatively correlate the second set of seed values with the first set of random seed values for a second color plane;
generating a third set of random seed values for a third color plane;
adjusting each of the random sets of seed values for each of the first, second and third color planes independently of any image information such that all of the random seed values are relatively large to increase the likelihood that dots will be printed sooner when a transition occurs between a zero image region and a nonzero image region; and
populating error buffers for each of the color planes with the random sets of seed values prior to starting the error diffusion process for reducing startup transients during the error diffusion operation, where the random sets of seed values are adjusted prior to populating the error buffers.

5. The method of claim 4, generating at least one set of seed values from a first constant.

6. The method of claim 5 including generating a second set of seed values from a second constant and then altering the seed values to negatively correlate to the first set.

7. The method of claim 6 including generating a third set of seed values from a third constant different from the first and second constants.

8. The method of claim 4 including performing a negative correlation from the first set of seed values to form the second set of seed values.

9. The method of claim 8 including multiplying the first set of seed values by a negative number to form the second set of seed values.

10. A method to initialize error buffers in a digital image reproduction system, comprising:
generating two separate independently generated random numbers from a random number generator;
generating a first normally distributed variable from the two numbers;
generating a first set of seed values from the first normally distributed variable for use as initial error values for starting up an error diffusion process;
generating a second normally distributed variable from the two numbers that is negatively correlated with the first normally distributed variable;
generating a second set of seed values for using as initial error values for starting up the error diffusion process from the second normally distributed variable;
generating a third normally distributed variable from the two numbers that is negatively correlated with the first normally distributed variable and the second normally distributed variable;
generating a third set of seed values for using as initial error values for starting up the error diffusion process from the third normally distributed variable
adjusting each of the first, second, and third sets of seed values prior to starting up the error diffusion process; and
initializing the error buffers with the first, second, and third set of seed values prior to starting the error diffusion operation.

11. The method according to claim 10 wherein the first normally distributed variable $X_1$ is generated according to the following:

$$X_1 = \sqrt{-2 \ln R_1} \cos(2\pi R_2);$$

where the second normally distributed variable $X_2$ is generated according to $$X_2 = \sqrt{-2 \ln R_1} \cos(2\pi(R_2 - 1/3));$$

the third normally distributed variable $X_3$ is generated according to $$X_3 = \sqrt{-2 \ln R_1} \cos(2\pi(R_2 - 2/3)); \text{ and}$$

$R_1$ and $R_2$ are independent random numbers uniformly distributed on a unit interval.

12. The method according to claim 10 where the first, second, and third set of seed values are adjusted by selecting only the seed values with relatively large values with respect to other seed values such that all of the adjusted seed values have a relatively large value, likely to cause a dot to be printed and increase the likelihood that dots will be printed sooner when a transition occurs between a zero image region and a nonzero image region.

13. A method for initializing multiple error buffers associated with an array of multiple different pixels for printing a digital image, comprising:
generating a set of multiple different random seed values from a random number generator independently of any image information associated with the array of pixels and independently of any error diffusion values associated with any of the pixels including generating random seed values associated with a first set of the array of pixels to be printed for a digital image;
initializing the multiple different error buffers for use as an initial set of error values for the array of multiple different pixels prior to starting any error diffusion operation;
adjusting the multiple different random seed values independently of any image information such that all of the random seed values are relatively large to increase the likelihood that dots will be printed sooner when a transition occurs between a zero image region and a nonzero image region;
initializing the multiple different error buffers associated with the array of multiple different pixels with the set of multiple different random seed values that were generated independently of any image information associated with the array of pixels prior to conducting any error diffusion operation on any of the multiple pixels including initializing a first set of the error buffers associated with the first set of the array of pixels to be printed for the digital image with the adjusted random seed values that were generated independently of any image information and adjusted prior to the starting of the error diffusion operation; and using the multiple different random seed values during a subsequent error diffusion operation on the multiple pixels including the first one of the pixels printed in the image.

14. The method according to claim 13 including loading the multiple different random seed values into the multiple different error buffers during a system initialization and power on stage prior to any image printing or error diffusion operations.

* * * * *

UNITED STATES PATENT AND TRADEMARK OFFICE
CERTIFICATE OF CORRECTION

PATENT NO. : 7,277,203 B1
APPLICATION NO. : 09/667964
DATED : October 2, 2007
INVENTOR(S) : John Charles Dalrymple It is certified that error appears in the above-identified patent and that said Letters Patent is hereby corrected as shown below:

At column 5, line 25, please replace "2inR" with --2lnR--

Signed and Sealed this

Seventeenth Day of February, 2009

JOHN DOLL
*Acting Director of the United States Patent and Trademark Office*